(12) United States Patent
Xia et al.

(10) Patent No.: US 12,346,089 B2
(45) Date of Patent: Jul. 1, 2025

(54) MODELING SYSTEM FOR COLLECTED DATA OF SENSORS ON NUMERICAL CONTROL MACHINE TOOL AND METHOD THEREFOR

(71) Applicant: JIANGSU NANGAO INTELLIGENT EQUIPMENT INNOVATION CENTER CO., LTD., Nanjing (CN)

(72) Inventors: Zhijie Xia, Alpharetta, GA (US); Zhisheng Zhang, Jiangsu (CN)

(73) Assignee: JIANGSU NANGAO INTELLIGENT EQUIPMENT INNOVATION CENTER CO., LTD., Nanjing (CN)

( * ) Notice: Subject to any disclaimer, the term of this patent is extended or adjusted under 35 U.S.C. 154(b) by 742 days.

(21) Appl. No.: 17/622,876

(22) PCT Filed: Dec. 30, 2019

(86) PCT No.: PCT/CN2019/130028
§ 371 (c)(1),
(2) Date: Dec. 27, 2021

(87) PCT Pub. No.: WO2021/134254
PCT Pub. Date: Jul. 8, 2021

(65) Prior Publication Data
US 2022/0244702 A1    Aug. 4, 2022

(51) Int. Cl.
*G05B 19/408*    (2006.01)
*G05B 19/414*    (2006.01)

(52) U.S. Cl.
CPC ..... *G05B 19/4086* (2013.01); *G05B 19/4144* (2013.01)

(58) Field of Classification Search
None
See application file for complete search history.

(56) References Cited

U.S. PATENT DOCUMENTS 7,764,958 B2 *   7/2010   Townsend ............. H04L 1/0045
                                                      455/423
2002/0029115 A1 *  3/2002  Moriuchi ............... B23Q 17/10
                                                      702/34

OTHER PUBLICATIONS

Karpuschewski, B., M. Wehmeier, and I. Inasaki. "Grinding monitoring system based on power and acoustic emission sensors." CIRP Annals 49.1 (2000): 235-240. (Year: 2000).*

(Continued)

*Primary Examiner* — Carlos R Ortiz Rodriguez
(74) *Attorney, Agent, or Firm* — Andrew C. Cheng (57) ABSTRACT

A modeling system for collected data of sensors on a numerical control machine tool and a method therefor. The modeling system comprises a plurality of sensors for collecting numerical control machine tool operation state data serving as multi-channel data, wherein an output end of a sensor is connected to an input end of a multi-channel sensor interface circuit, and an output end of the multi-channel sensor interface circuit is connected to a controller. The plurality of sensors are multi-path temperature sensors. Data that is collected by each sensor and is transmitted to the controller serves as one piece of channel data. The method effectively prevents the defect in the prior art of there being no model for researching a cross correlation of multi-channel data, collected by a plurality of sensors, of an operation state of a numerical control machine tool.

7 Claims, 1 Drawing Sheet

(56) References Cited

OTHER PUBLICATIONS

Wehmeier, M., and I. Inasaki. "Investigation and utilization of the acoustic emission signal for monitoring the dressing process." Proceedings of the Institution of Mechanical Engineers, Part B: Journal of Engineering Manufacture 216.4 (2002): 543-553. (Year: 2002).*
Hillaire, Robert, and Paul K. Wright. "A process monitoring system for process-based product validation." Journal of manufacturing processes 7.1 (2005): 69-74. (Year: 2005).*
Humphreys, Ivor, Gerrit Eisenblätter, and Garret E. O'Donnell. "FPGA based monitoring platform for condition monitoring in cylindrical grinding." Procedia CIRP 14 (2014): 448-453. (Year: 2014).*
Martinova, Liliya, Sergey Sokolov, and Mikhail Babin. "Organization of process equipment monitoring." 2019 XXI International Conference Complex Systems: Control and Modeling Problems (CSCMP). IEEE, 2019. (Year: 2019).*
Liu, Shihao, and Mao Lin. "Thermal-mechanical coupling analysis and experimental study on CNC machine tool feed mechanism." International Journal of Precision Engineering and Manufacturing 20 (2019): 993-1006. (Year: 2019).*
Eder, Cornelia, Thomas Becker, and Antonio Delgado. "Four-channel sensor-array for the non-contact temperature measurement of liquids in hermetically closed systems." Food control 20.12 (2009): 1119-1126. (Year: 2009).*

\* cited by examiner

MODELING SYSTEM FOR COLLECTED DATA OF SENSORS ON NUMERICAL CONTROL MACHINE TOOL AND METHOD THEREFOR

CROSS REFERENCE TO RELATED APPLICATION

The present application is a 35 U.S.C. § 371 National Phase conversion of International (PCT) Patent Application No. PCT/CN2019/130028, filed on Dec. 30, 2019. The entire disclosure of the above-identified application is hereby incorporated by reference herein and made a part of this specification.

TECHNICAL FIELD

The present invention relates to the technical field of numerical control machine tools, and also belongs to the technical field of sensors, in particular to a modeling system for collected data of sensors on a numerical control machine tool and a method therefor, in particular to a modeling system for collected multi-channel data of sensors on a numerical control machine tool and a method therefor.

BACKGROUND

CNC machine tool is the abbreviation of computer numerical control machine tool, which is an automatic machine tool equipped with a program control system. The control system can logically process a program with a control code or other symbolic instructions, decode it, express it with coded numbers, and input it into the numerical control device through an information carrier. After arithmetic processing, the numerical control device sends out various control signals to control the action of the machine tool, and automatically process the parts according to the shape and size required by the drawing.

With the popularity of CNC machine tools, more and more users choose to use CNC machine tools instead of ordinary machine tools. The use of CNC machine tools, on the one hand, can improve production efficiency and product accuracy; on the other hand, it saves labor, and one operator can manage a plurality of CNC machine tools at the same time.

CNC machine tools are the most common mechanical equipment in the industrial machining process, which can provide high-precision and high-level machining services. Because it is expensive, and its operating status plays a key role in product processing quality and processing efficiency, accurate and timely monitoring of CNC machine tool operating status can help improve product quality, production efficiency and avoid potential risks. Therefore, in the modern machining process There is an urgent need for real-time monitoring of machine tool operating status devices.

Therefore, a plurality of sensors are set on the CNC machine tool to collect the operating status of the CNC machine tool. In this way, the data collected on the operating status of the CNC machine tool forms multi-channel data. The status data of the CNC machine tool collected through a plurality of sensors usually has heterogeneous characteristics. There is a potential cross-correlation between the data, this correlation sometimes changes with time or the state of the CNC machine tool, but there is no model for researching the cross-correlation of the multi-channel data collected by the plurality of sensors on the operating state of the CNC machine tool.

SUMMARY

In order to solve the above-mentioned problems, the present invention provides a modeling system and method for collected data of sensors on a numerical control machine tool, which effectively avoids the prior art that has no model for researching the cross-correlation of the multi-channel data collected by a plurality of sensors on the operating state of the numerical control machine tool.

In order to overcome the deficiencies in the prior art, the present invention provides a solution to a modeling system and method for collected data of sensors on a numerical control machine tool, as follows:

A modeling system for collected data of sensors on a numerical control machine tool, including a plurality of sensors for collected data on the running state of the numerical control machine tool as multi-channel data;

an output end of the sensor is connected to an input end of a multi-channel sensor interface circuit, and an output end of the multi-channel sensor interface circuit is connected to a controller.

The controller can be a single-chip microcomputer, a PLC, an FPGA processor or an ARM processor.

The plurality of sensors can be multi-path of temperature sensors, multi-path vibration sensors, or multi-path of noise sensors;

the multi-path temperature sensors are dispersedly installed on a temperature measurement portion on the numerical control machine tool; the multi-channel vibration sensors are dispersedly installed on a rotor of a servo motor of the numerical control machine tool, and the multi-path noise sensors are dispersedly installed on a processing of the numerical control machine tool;

the number of the plurality of sensors is p, and p is a positive integer greater than or equal to 2, and the data collected by each sensor and transmitted to the controller is regarded as one channel data.

The controller is also connected to a display screen.

The controller is also connected to a flash memory, and the flash memory includes a construction module, a setting module, an overlay module, an export module, and a limit module;

the construction module is configured to form the received p-channel data into tensor-data-one of the p-channel, the tensor-data-one of the p-channel includes n sample data collected by the plurality of sensors, and each sample data includes data collected by a plurality of sensors at a certain sampling time, and the data format of the i-th sample data $Yi(t)$ is: $Yi(t)=[Yi1(t), \ldots, Yip(t)]$, t is the sampling time of the i-th sample data; $Yi(t)$ can be expressed by formula (1):

$$Yij(t)=Xij(t)\varepsilon+ij(t) \quad (1)$$

$Xij(t)$ is the signal function of the collected data of the jth channel, $\varepsilon ij(t)$ is a noise function of the collected data of the jth channel, i is a positive integer less than or equal to N, j is a positive integer less than or equal to p, $Yij(t)$ represents the collected data of the j-th channel at a sampling time t;

the setting module is configured to set the data format of the tensor-data-two $Xi(t)$ of the p channel as: $Xi(t)=[Xi1(t), \ldots, Xip(t)]$, and the data format of the tensor-data-two $Xi(t)$ of the p channel is divided into L sample subspaces $Sl$, $l=1, 2, \ldots, L$, L is a positive integer, in the same sample subspace, there is cross-correlation between the signal functions representing each signal, the signal functions of each signal in different sample subspaces have no correlation;

the superposition module is configured to set each sample subspace Sl as a linear superposition of Φl of dl basis functions, as shown in formula (2), wherein Φl=[Φl(t) ... Φldl(t)]:

$$S_l \triangleq \left\{ X(t) \mid X(t) = \sum_{q=1}^{d_l} \alpha_q \phi_{lq}(t), \alpha_q \in R \right\} \quad (2)$$

for all signal functions Xij(t), i=1, ... ,N, the sample subspace to which Xij(t) belongs remains unchanged, while the basis coefficients aij corresponding to Xij(t) are different, aij=[aij1, aij2 ... , aijdl], and aijk is the k-th component of the basis coefficient aij, where k is a positive integer less than or equal to dl;
wherein Xl represent the signals of the respective sample subspaces, wherein Xl={Xj(t)|Xj(t)∈Sl, j=1 ... p}, q and dl are both positive integers, and αq is a set real number, R is the set of real numbers;
wherein the export module is configured to obtain the formula (3) for each signal, Xij(t), Xij(t)∈Xl, according to the self-expression property of data that each data point in the sample subspace can be jointly represented by other data points in the data set:

$$X_{ij}(t) = \sum_{X_{ir}(t) \in X_l} b_{jr} X_{ir}(t) \quad (3)$$

that is, Xij(t) is a signal function in Xl, which can be expressed as a linear combination of other pl-1 signals in this sample subspace, r is a positive integer, and bjr is the rth component of the sparse coefficient;
the limit module is configured to limit the solution set by using the Lq norm to minimize an objective function for the solution of the sparse coefficient bj.

The method for a modeling system for collected data of sensors on a numerical control machine tool, which runs on a controller, includes the following steps:
Step 1: a plurality of sensors transmitting collected p-channel data to the controller through the multi-channel sensor interface circuit, and the controller converting a received p-channel data into tensor-data-one of the p-channel, the tensor-data-one of the p-channel including n sample data collected by the plurality of sensors, each sample data including data collected by plurality of sensors at a certain sampling time, and wherein the data format of the i-th sample data Yi(t) being: Yi(t)=[Yi1(t), ... , Yip(t)], t is the sampling time of the i-th sample data; Yi(t) can be expressed by formula (1):

$$Yij(t) = Xij(t) + \varepsilon ij(t) \quad (1)$$

Xij(t) is the signal function of the collected data of the jth channel, εij(t) is the noise function of the collected data of the jth channel, i is a positive integer less than or equal to N, j is a positive integer less than or equal to p, Yij(t) represents the collected data of the j-th channel at the sampling time t;
Step 2: setting the data format of the tensor-data-two of the p channel Xi(t) as: Xi(t)=[Xi1(t), ... , Xip(t)], wherein the tensor-data-two of the p channel Xi(t) is divided into L sample subspaces Sl, l=1, 2, ... , L, L are positive integers, in the same sample subspace, the signal functions representing each signal have cross-correlation, The signal functions of each signal in different sample subspaces has no correlation;

Step 3: setting each sample subspace Sl as a linear superposition of Φl of dl basis functions, as shown in formula (2), wherein Φl=[Φl1(t) ... Φldl(t)]:

$$S_l \triangleq \left\{ X(t) \mid X(t) = \sum_{q=1}^{d_l} \alpha_q \phi_{lq}(t), \alpha_q \in R \right\} \quad (2)$$

for all signal functions Xij(t), i=1, ... ,N, the sample subspace to which Xij(t) belongs remains unchanged, while the basis coefficients corresponding to Xij(t) are different, and αijk is the k-th component of the basis coefficient αij, where k is a positive integer less than or equal to dl;
wherein Xl represent the signals of the respective sample subspaces, wherein Xl={Xj(t)|Xj(t)∈Sl, j=1 ... p}, q and dl are both positive integers, and αq is a set real number, R is the set of real numbers;
Step 4: obtaining formula (3) for each signal Xij(t), Xij(t)∈Xl, according to the self-expression property of data that each data point in the sample subspace can be jointly represented by other data points in the data set:
Step 4: obtaining formula (3) for each signal Xij(t)∈Xl, according to the self-expression property of data that each data point in the sample subspace can be jointly represented by other data points in the data set:

$$X_{ij}(t) = \sum_{X_{ir}(t) \in X_l} b_{jr} X_{ir}(t) \quad (3)$$

that is, Xij(t) is a signal function in Xl, which can be expressed as a linear combination of other pl-1 signals in this sample subspace, r is a positive integer, and bjr is the rth component of a sparse coefficient;
Step 5: using the Lq norm to minimize an objective function to limit solution set for solution of the sparse coefficient bj.
The restriction conditions for using the Lq norm to minimize the objective function to limit the solution set for the solution of the sparse coefficient bj are as shown in the formula group (4)

$$\min \|b_j\|_q$$

subject to $X_{ij}(t) = X_i(t) b_j, b_{jj} = 0$ (4)

wherein q is the set integer value, which can take the value 1;
Using convex programming tools such as the formula group (5) to effectively solve the sparse coefficient bj, s in the formula group (5) is a sampling time after the time t:

$$\min \|b_j\|_1 + \frac{1}{2} \sum_{i=1}^{N} \int Z_{ij}(t) \Gamma_j(t, s)^{-1} Z_{ij}(s) dt ds \quad (5)$$

subject to $Z_{ij}(t) = Y_{ij}(t) - Y_i(t) b_j, b_{jj} = 0$

In this way, the sparsity coefficients bj can be obtained and displayed on the display screen, j=1, ... , p.
The beneficial effects of the present invention are:
by finally using convex programming tools to effectively solve the sparse coefficient bj, the sparse coefficient bj reflecting the cross-correlation performance of the multi-channel data can be obtained, and the cross-correlation of the multi-channel data collected by the plurality of sensors on the operating state of the CNC machine tool can be formed, which effectively avoids the prior art that has no model for researching the cross-correlation of the multi-channel data collected by a plurality of sensors on the operating state of the numerical control machine tool.

DETAILED DESCRIPTION OF PREFERRED EMBODIMENTS

The present invention will be further described below with reference to the drawings and embodiments.

Figure 1:
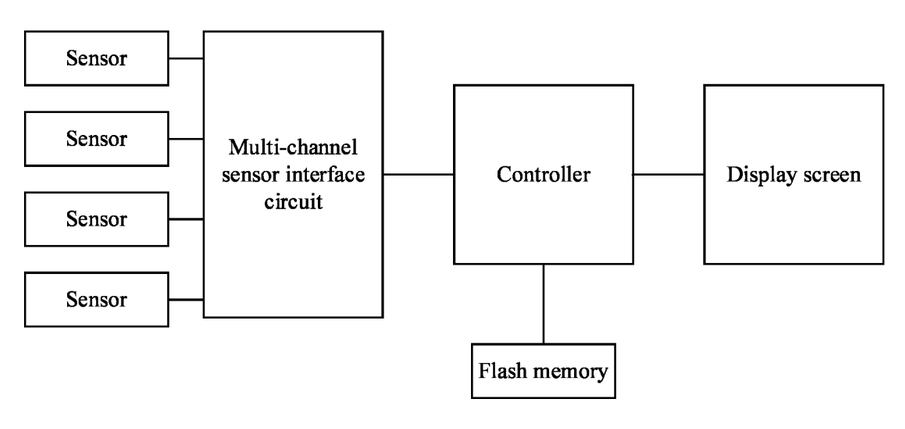
FIG. 1 is an overall schematic diagram of a modeling system for collected data of sensors on a numerical control machine tool according to the present invention.

As shown in FIG. 1, the modeling system for collected data of sensors on a numerical control machine tool includes a plurality of sensors for collected data on the running state of the numerical control machine tool as multi-channel data; an output of the sensor is connected to an input end of a multi-channel sensor interface circuit. The controller can be a single-chip microcomputer, a PLC, an FPGA processor or an ARM processor. The plurality of sensors can be multi-path temperature sensors, multi-path vibration sensors, or multi-path noise sensors; the multi-path temperature sensors are dispersedly installed on a temperature measurement portion on the numerical control machine tool; the multi-channel vibration sensors are dispersedly installed on a rotor of a servo motor of the numerical control machine tool, and the multi-path noise sensors are dispersedly installed on a processing cutter of the numerical control machine tool; the number of the plurality of sensors is p, and p is a positive integer greater than or equal to 2, and data collected by each sensor and transmitted to the controller is regarded as one piece of channel data. The controller is also connected to a display screen. The controller is also connected to a flash memory, and the flash memory includes a construction module, a setting module, an overlay module, an export module, and a limit module; the construction module is configured to form the received p-channel data into tensor-data-one of the p-channel, the tensor-data-one of the p-channel includes n sample data collected by the plurality of sensors, each sample data includes data collected by the plurality of sensors at a certain sampling time, and data format of the i-th sample data Yi(t) is: Yi(t)=[Yi1(t), ..., Yip(t)], t is the sampling time of the i-th sample data; Yi(t) can be expressed by formula (1):

$$Yij(t) = Xij(t) + \varepsilon ij(t) \qquad (1)$$

Xij(t) is a signal function of the collected data of the jth channel, εij(t) is an independent noise function of the collected data of the jth channel, i is a positive integer less than or equal to N, j is a positive integer less than or equal to p, Yij(t) represents the collected data of the j-th channel at the sampling time t;

the setting module is configured to set the data format of the tensor-data-two Xi(t) of the p channel as: Xi(t)=[Xi1(t), ...,Xip(t)], and the data format of the tensor-data-two Xi(t) of the p channel can be divided into L different sample subspaces Sl, l=1, 2, ..., L, L is a positive integer, in the same sample subspace, there is strong cross-correlation between the signal functions representing each signal, the signal functions of each signal in different sample subspaces have almost no correlation;

The superposition module is configured to set each sample subspace Sl as a linear superposition of Φl::Φl=[Φl1(t), ..., Φldl(t)] of dl basis functions, as shown in formula (2):

$$S_l \triangleq \left\{ X(t) \mid X(t) = \sum_{q=1}^{d_l} \alpha_q \phi_{lq}(t), \alpha_q \in R \right\} \qquad (2)$$

For all signal functions Xij(t), i=1, ... ,N, the sample subspace to which Xij(t) belongs remains unchanged, while the basis coefficients αij=[αij 1, αij2 ... , αijdl] corresponding to Xij(t) are different, and αijk is the k-th component of the basis coefficient αij, where k is a positive integer less than or equal to dl;

Xl={Xj(t)|Xj(t)∈Sl, j=1, ... ,p} can be used to represent the signal of each sample subspace, wherein q and dl are both positive integers, and αq is a set real number, R is the set of real numbers;

the export module is configured to obtain the formula (3) for each signal Xij(t)∈Xl, according to the self-expression property of data that each data point in the sample subspace can be jointly represented by other data points in the data set:

$$X_{ij}(t) = \sum_{X_{ir}(t) \in X_l} b_{jr} X_{ir}(t) \qquad (3)$$

That is, Xij(t) is a signal function in Xl, which can be expressed as a linear combination of other pl-1 signals in this sample subspace, r is a positive integer, and bjr is the rth component of the sparse coefficient;

The limit module is configured to limit the solution set by using the Lq norm to minimize the objective function for the solution of the sparse coefficient bj.

The method for the modeling system for collected data of sensors on the numerical control machine tool, which runs on the controller, includes the following steps:

Step 1: the plurality of sensors transmitting the collected p-channel data to the controller through the multi-channel sensor interface circuit, and the controller converting the received p-channel data into tensor-data-one of the p-channel, the tensor-data-one of the p-channel including n sample data collected by the plurality of sensors, each sample data including data collected by the plurality of sensors at the certain sampling time, and wherein the data format of the i-th sample data Yi(t) is: Yi(t)=[Yi1(t), ..., Yip(t)], t is the sampling time of the i-th sample data; Yi(t) can be expressed by formula (1):

$$Yij(t) = Xij(t) + \varepsilon ij(t) \qquad (1)$$

Xij(t) is the signal function of the collected data of the jth channel, εij(t) is the noise function of the collected data of the jth channel, i is the positive integer less than or equal to N, j is the positive integer less than or equal to p, Yij(t) represents the collected data of the j-th channel at the sampling time t;

Step 2: Setting the data format of the tensor-data-two of the p channel Xi(t) as: Xi(t)=[Xi1(t), ...,Xip(t)], wherein the tensor-data-two of the p channel Xi(t) can be divided into L different sample subspaces Sl, l=1, 2, ..., L, L is the positive integer, in the same sample subspace, the signal functions representing each signal have strong cross-correlation, the signal functions of each signal in different sample subspaces have almost no correlation;

Step 3: setting each sample subspace Sl as the linear superposition of Φl: Φl=[Φl1(t), . . . , Φldl(t)] of dl basis functions, as shown in formula (2):

$$S_l \triangleq \left\{ X(t) \mid X(t) = \sum_{q=1}^{d_l} \alpha_q \phi_{lq}(t), \alpha_q \in R \right\} \quad (2)$$

for all signal functions Xij(t), i=1, . . . ,N, the sample subspace to which Xij(t) belongs remains unchanged, while the basis coefficients corresponding to Xij(t) are different, and αijk is the k-th component of the basis coefficient αij, where k is the positive integer less than or equal to dl;

Use Xl={Xj(t)|Xj(t)∈Sl, j=1, . . . ,p} to represent the signals of the respective sample subspaces, wherein q and dl are both positive integers, and αq is the set real number, R is the set of real numbers;

Step 4: obtaining formula (3) for each signal Xij(t)∈Xl, according to the self-expression property of data that each data point in the sample subspace can be jointly represented by other data points in the data set:

$$X_{ij}(t) = \sum_{X_{ir}(t) \in X_l} b_{jr} X_{ir}(t) \quad (3)$$

that is, Xij(t) is the signal function in Xl, which can be expressed as the linear combination of other pl-1 signals in this sample subspace, r is the positive integer, and bjr is the rth component of the sparse coefficient;

Step 5: the sparse coefficient bj may have infinitely many solutions, but the Lq norm can be used to minimize the objective function to limit the solution set for the solution of the sparse coefficient bj.

The restriction conditions for using the Lq norm to minimize the objective function to limit the solution set for the solution of the sparse coefficient bj are as shown in the formula group (4):

$$\min \|b_j\|_q$$

$$\text{subject to } X_{ij}(t) = X_i(t) b_j, b_{jj} = 0 \quad (4)$$

Wherein q is the set integer value, which can take the value 1;

Different choices of q have different effects on the solution of the sparsity coefficient bj. Generally, by reducing the value of q from infinity to zero, the sparsity of the solution will increase. To efficiently find the sparse representation of Xij(t) under the non-trivial process in Xi(t), consider the strict convex relaxation that minimizes the L0 norm, that is, the L1 norm. This can be done, but use convex programming tools such as formula (5) group to effectively obtain the sparse coefficient bj. The s in the formula (5) group is the next sampling time of time t:

$$\min \|b_j\|_1 + \frac{1}{2} \sum_{i=1}^{N} \int Z_{ij}(t) \Gamma_j(t,s)^{-1} Z_{ij}(s) dt ds \quad (5)$$

$$\text{subject to } Z_{ij}(t) = Y_{ij}(t) - Y_i(t) b_j, b_{jj} = 0$$

In this way, the sparsity coefficients bj, j=1, . . . ,p can be obtained and displayed on the display screen, so that the sparsity coefficient bj reflecting the cross-correlation performance of the multi-channel data can be obtained.

In addition, in order to store a backup sparse coefficient, the controller is often connected to a wireless communication module such as a 3G module or a 4G module, and the wireless communication module communicates with a backup platform in the 3G network or the 4G network respectively through the 3G network or the 4G network. After the backup platform obtains information of the sparse coefficient, it is stored in the backup platform, and a computer-one is often used as the backup platform. This is determined by the advantages of the computer-one in information transmission and its wide application. Once the computer-one used as the backup platform is used for a long time, it will inevitably fail frequently, which affects the acquisition and storage of the information of the sparse coefficient, so that another computer with better performance will be introduced to serve as the backup platform. During the replacement of the computer-one and a computer-two, it is necessary to save the information of the sparse coefficient of the computer-one to the computer-two. When saving the information of the sparse coefficient of the computer-one to the computer-two, it is often necessary to save the information on the computer-one to an intermediate server in the network, and then the information of the sparse coefficient stored in the intermediate server is sent to the computer-two, and the computer-two executes the restoration after obtaining the information of the sparse coefficient; during the sending of the information of the sparse coefficient, if link of the computer-one and the computer-two is interrupted, the computer-one has to send the information of the sparse coefficient again. When the quality of the link between the computer-one and the computer-two is not good, it is often necessary to send the information of the sparse coefficient several times, that makes the information transmission performance of the sparse coefficient bad.

Improvements have been made to address the above shortcoming. In order to store and backup the sparsity coefficient, the controller is often connected with a wireless communication module such as a 3G module or a 4G module. The wireless communication module communicates with the backup platform in the 4G network or the 3G network through the 3G network or the 4G network, respectively. After the backup platform obtains the information of the sparse coefficient, it is stored in the backup platform, and the computer-one is often used as the backup platform; the computer-one and the computer-two communicate through the network, and then send the information of the sparse coefficient in the computer-one to the computer-two for storage, and the method of sending the information of the sparse coefficient in the computer-one to the computer-two includes the following methods:

B-1: the computer-one obtaining the information of the sparsity coefficient to be saved in the computer-one;

Here, the information of the sparse coefficient to be saved is the information of the sparse coefficient that has not been saved in the computer-one, and the information of the sparse coefficient can be stored on the computer-one to give the information of the sparse coefficient different weights value, the earlier the time stored on the computer, the lower the weight value of the information of the sparse coefficient.

B-2: the computer-one obtaining a transfer command for the information of the sparse coefficient to be saved;

Here, the transfer command can be activated by the selection of the information transfer function key of the sparse coefficient on the input interface of the computer-one.

B-3: the computer using run-length coding algorithm to reduce the capacity of the information of the sparse coefficient to be saved, and obtaining a number of information frames of reduced sparse coefficient;

The computer uses the run-length coding algorithm to reduce the capacity of the information of sparse coefficient to be saved, and the capacity required for the information frame of the reduced sparse coefficient is lower than the capacity required for the information of the sparse coefficient to be stored. Performing B-3 can reduce the required capacity area; when the capacity of the information of the sparse coefficient to be stored is not small, the information of the sparse coefficient to be stored can be reduced to a number of information frames of the reduced sparse coefficient, just like, the capacity size of the information of the sparse coefficient to be saved is 2000*1024 bits, which can be reduced to 800 600-bit information frames of the reduced sparse coefficient. Compared with the information of the sparse coefficient to be saved, each size of the information frame of the reduced sparse coefficient is much lower, so sending the information frame of the reduced sparse coefficient is much more efficient than sending the information of the sparse coefficient to be saved.

The method of the computer-one executing reduction of the information of the sparse coefficient to be saved, to obtain several reduced information frames of the sparse coefficient, can be specifically as follows:

the computer-one uses a run-length coding algorithm to reduce the information of the sparse coefficient to be saved, and obtains a number of reduced information frames of the sparse coefficient.

Here, the run-length coding algorithm is set in advance by the computer-one, and the run-length coding algorithm can also be replaced by a dictionary algorithm. The computer-one can set a dictionary with keys and values in advance in the same way with the computer-two, the dictionary is used as a setting encoding information, the computer-one can also construct the encoding information itself and serve as the setting encoding information. The computer-one uses the setting encoding information to reduce the information of the sparse coefficient to be saved, to obtain the reduced information frame of the sparse coefficient, which can improve the reliability of the reduced information frames of the sparseness coefficient during transmission.

Before executing B-5, it can also execute the following methods:

the setting decoding information corresponding to the setting encoding information of the computer-one is sent to the computer-two, and the setting decoding information is used for the computer-two to perform decoding on obtained information frame of the reduced sparse coefficient.

Here, after the computer-one uses the setting encoding information to reduce the information of the sparse coefficient to be saved, and obtains the reduced information frame of the sparse coefficient, in order for the computer-two can obtain the information of the sparse coefficient to be saved in the reduced information frame of the sparse coefficient, after obtaining the reduced information frame of the sparse coefficient, the computer-one must send the setting decoding information corresponding to the setting encoding information to the computer-two, so that the computer-two can use the setting encoding information performs decoding on the obtained reduced information frame of the sparse coefficient.

B-4: the computer-one building an information link between the computer-one and the computer-two;

Able to construct an information link between the computer-one and the computer-two via the computer-one or the computer-two; before constructing the information link, the computer-one must be confirmed by the computer-two's response, or the computer-two must be confirmed by the computer-one's response to improve the reliability of the information link. For example, the computer-two realizes that it stores a character string like aaaa that is configured to respond, and it must send a character string like aaaa to the computer-two on the computer-one to build an information link.

B-5: the computer-one sending a number of reduced information frames with sparse coefficients to the computer-two, based on the conditions of the information link between the computer-one and the computer-two;

The computer-one can send different reduced information frames of sparsity coefficients under the conditions of different information links, just like, when the information link conditions are good, the computer-one can send large-capacity reduced information frame of sparsity coefficients, when the information link status is not good, the computer-one sends a small capacity reduced information frame of sparsity coefficient, to achieve adjustable sending of several reduced information frames of sparsity coefficients under different information link conditions, which can improve the information transmission performance of the sparse coefficient.

The way that computer-one sends a number of reduced information frames of the sparse coefficient to the computer-two based on the conditions of the information link between the computer-one and the computer-two is described in detail as follows:

if the condition of the information link between the computer-one and the computer-two is that the transmission speed of the information link is low, the computer-one sends a reduced information frame of the sparse coefficient with a low weight value to the computer-two;

if the condition of the information link between the computer-one and the computer-two is that the transmission speed of the information link is high, the computer-one sends a reduced information frame of the sparse coefficient with a high weight value to the computer-two.

When the transmission speed of the information link is low, the reduced information frame of the sparse coefficient is not transmitted quickly. It often happens that the reduced information frame of the sparse coefficient is unsuccessfully sent and then transmitted again. If the information frame of the sparse coefficient is transmitted again several times, the probability of losing the information frame of the sparse coefficient with high weight value will increase. The reliability of the reduced information frame of the sparse coefficient with high weight value cannot be guaranteed. The condition of the information link between the computer-one and the computer-two is that under transmission speed of the information link is low, the computer-one sends the reduced information frame of the sparse coefficient with the low weight value to the computer-two; if the condition of the information link between the computer-one and the computer-two is that transmission speed of the information link is high, the computer-one sends the reduced information frame of the sparse coefficient with the high weight value to the computer-two. It is possible to improve the transmission reliability of the reduced information frame of the sparse coefficient.

B-5 can include:

under the condition that the information link status between the computer-one and the computer-two is high, the computer-one using several processes to send a number of reduced information frames of the sparse coefficient to the computer-two;

Here, the computer can run several processes. Under the condition that the information link state is high, it can concurrently send several reduced information frames of sparse coefficients on several processes, just like if the computer is running With K processes, then the computer can send K reduced information frames of sparse coefficients concurrently, where K is a natural number, so that several reduced information frames of sparse coefficients can be sent concurrently, which can improve sending speed of the information of sparse coefficients.

After executing B-5, the following methods can also be executed:

the computer-one monitoring whether the information link between the computer-one and computer two is interrupted;

If so, the computer-one registers reduced information frames of the sparsity coefficient which are not sent or sent unsuccessfully, and reduced information frames of the sparsity coefficient which are not sent or sent unsuccessfully are registered as not sent;

When the computer-one and the computer-two restore the information link, the computer-one sends a number of reduced information frames of the sparse coefficient that registered as not sent to the computer-two.

Here, the reduced information frame of the sparse coefficient that fails to be transmitted can be that the information link unexpectedly interrupted when the computer-one sends the reduced information frame of the sparse coefficient, so that the transmission of the reduced information frame of the sparse coefficient is unsuccessful. Generally, after the computer-one sends a reduced information frame of the sparsity coefficient to the computer-two, if the computer-two obtains the reduced information frame of the sparsity coefficient, it will return a response message, and the computer-one will register the reduced information frame of the sparse coefficient as being sent. And if the computer-one does not receive the response message, the computer-one will register the reduced information frame of the sparse coefficient as not being sent.

When the computer-one and the computer-two interrupt the information link, the computer-one records reduced information frames of the sparsity coefficients that are not sent and unsuccessfully sent, and registers the reduced information frames of the sparsity coefficients as not sent; when the computer-one and the computer-two restores the information link, the computer-one send the reduced information frames of the sparsity coefficient which is registered as not sent to the computer-two. In this way, when computer-one and the computer-two restore the information link, there is no need to send a number of reduced information frames of the sparse coefficient again, which can improve the information transmission performance of the sparse coefficient.

The reduced information frames of the sparseness coefficients can be sent to the computer-two based on the condition of the information link between the computer-one and the computer-two. When the condition of the information link is good, the reduced information frames of sparse coefficients can be sent with large capacity; when the conditions of the information link are not good, it can send reduced information frames of sparse coefficients with a small capacity, that can adjust and send several reduced information frames of sparse coefficients under different information link conditions. In this way, the information transmission performance of the sparse coefficient can be improved.

The present invention has been described above in the form of illustrative embodiments. Those skilled in the art should understand that the present disclosure is not limited to the above-described embodiments, and various changes and replace can be made without departing from the scope of the present invention.

What is claimed is:

1. A modeling system for collected data of sensors on a numerical control machine tool, comprising a controller, a flash memory and a plurality of sensors for collected data on a running state of the numerical control machine tool as multi-channel data;

wherein, an output end of a sensor is connected to an input end of a multi-channel sensor interface circuit, and an output end of the multi-channel sensor interface circuit is connected to the controller;

wherein the controller is also connected to the flash memory, and the flash memory comprises a construction module, a setting module, a superposition module, an export module, and a limit module;

wherein the construction module is configured to form received p-channel data into tensor-data-one of a p-channel, the tensor-data-one of the p-channel comprises n sample data collected by the plurality of sensors, and each sample data comprises data collected by the plurality of sensors at a certain sampling time, and data format of an i-th sample data $Yi(t)$ is: $Yi(t)=[Yi1(t), \ldots, Yip(t)]$, t is a sampling time of the i-th sample data; $Yij(t)$ is expressed by a formula (1):

$$Yij(t)=Xij(t)+\varepsilon ij(t) \qquad (1)$$

$Xij(t)$ is a signal function of the collected data of a jth channel, $\varepsilon ij(t)$ is a noise function of the collected data of the j-th channel, i is a positive integer less than or equal to N, j is a positive integer less than or equal to p, $Yij(t)$ represents the collected data of the j-th channel at a sampling time t;

wherein the setting module is configured to set data format of tensor-data-two $Xi(t)$ of the p channel as: $Xi(t)=[Xi1(t), \ldots, Xip(t)]$, and the data format of the tensor-data-two $Xi(t)$ of the p channel is divided into L sample subspaces $Sl$, $l=1, 2, \ldots, L$, L is a positive integer, there is cross-correlation between signal functions corresponding to signals in a same sample subspace, the signal functions corresponding to signals in different sample subspaces have no correlation;

wherein the superposition module is configured to set each sample subspace $Sl$ as a linear superposition of $\Phi l$ of $dl$ basis functions, as shown in a formula (2), wherein $\Phi l=[\Phi l1(t), \ldots, \Phi ldl(t)]$:

$$S_l \triangleq \left\{ X(t) \mid X(t) = \sum_{q=1}^{d_l} \alpha_q \phi_{lq}(t), \alpha_q \in R \right\} \qquad (2)$$

for all signal functions $Xij(t)$, $l=1, \ldots, N$, a sample subspace to which $Xij(t)$ belongs remains unchanged, while basis coefficients $aij$ corresponding to $Xij(t)$ are different, $aij=[aij1, aij2 \ldots, aijdl]$, and $aijk$ is a k-th component of the basis coefficients $aij$, where k is a positive integer less than or equal to $dl$;

wherein $Xl$ represents the signals of the respective sample subspaces, wherein $Xl=\{Xj(t)|Xj(t)\in Sl, j=1, \ldots, p\}$, q and $dl$ are both positive integers, and $\alpha g$ is a set real number, R is the set of real numbers;

wherein the export module is configured to obtain a formula (3) for each signal Xij(t), Xij(t) ∈Xl, according to a self-expression property of data that each data point in the sample subspace can be jointly represented by other data points in a data set:

$$Xij(t)=\Sigma_{X_{ir}(t)\in X_l} b_{jr} X_{ir}(t) \quad (3)$$

that is, Xij(t) is a signal function in Xl, which can be expressed as a linear combination of other pl-1 signals in this sample subspace, r is a positive integer, and bjr is a rth component of a sparse coefficient;

the limit module is configured to limit solution set by using an Lq norm to minimize an objective function for a solution of the sparse coefficient bj;

wherein the modeling system comprises a computer-one, a method runs on the computer-one, and comprises following steps:

the computer-one building an information link between the computer-one and a computer-two;

the computer-one sending a number of reduced information frames with the sparse coefficient to the computer-two, based on conditions of the information link between the computer-one and the computer-two;

wherein the computer-one sends different reduced information frames of the sparse coefficient under the conditions of different information links;

after the computer-one sending a number of reduced information frames with the sparse coefficient to the computer-two, based on the conditions of the information link between the computer-one and the computer-two, the computer-one monitoring whether the information link between the computer-one and computer two is interrupted;

when so, the computer-one registers reduced information frames of the sparse coefficient which are not sent or sent unsuccessfully, and the reduced information frames of the sparse coefficient which are not sent or sent unsuccessfully are registered as not sent;

when the computer-one and the computer-two restore the information link, the computer-one sends a number of reduced information frames of the sparse coefficient that registered as not sent to the computer-two.

2. The modeling system for collected data of sensors on a numerical control machine tool according to claim 1, wherein the controller is a single-chip microcomputer, a programmable logic controller, a field-programmable gate array processor or an advanced reduced instruction set computer machine processor.

3. The modeling system for collected data of sensors on a numerical control machine tool according to claim 1, wherein the plurality of sensors are multi-path temperature sensors, multi-path vibration sensors, or multi-path noise sensors;

wherein the multi-path temperature sensors are distributed at an interval on a temperature measurement portion on the numerical control machine tool; the multi-channel vibration sensors are at an interval on a rotor of a servo motor of the numerical control machine tool, and the multi-path noise sensors are at an interval on a processing cutter of the numerical control machine tool;

wherein the number of the plurality of sensors is p, and p is a positive integer greater than or equal to 2, and data collected by each sensor and transmitted to the controller is regarded as one piece of channel data.

4. The modeling system for collected data of sensors on a numerical control machine tool according to claim 1, wherein the controller is also connected to a display screen.

5. A method for a modeling system for collected data of sensors on a numerical control machine tool, wherein the modeling system comprises a controller, and the method runs on the controller, and comprises the following steps:

step 1: a plurality of sensors transmitting collected p-channel data to the controller through a multi-channel sensor interface circuit, and the controller converting a received p-channel data into tensor-data-one of a p-channel, the tensor-data-one of the p-channel comprising n sample data collected by the plurality of sensors, each sample data comprising data collected by the plurality of sensors at a certain sampling time, and wherein data format of an i-th sample data Yi(t) being: Yi(t)=[Yi1(t), . . . , Yip(t)], t is a sampling time of the i-th sample data; Yij(t) is expressed by a formula (1):

$$Yij(t)=Xij(t)+\varepsilon ij(t) \quad (1)$$

wherein Xij(t) is a signal function of the collected data of a jth channel, εij(t) is a noise function of the collected data of the j-th channel, i is a positive integer less than or equal to N, j is a positive integer less than or equal to p, Yij(t) represents the collected data of the j-th channel at a sampling time t;

step 2: setting a data format of a tensor-data-two of the p channel Xi(t) as: Xi(t)=[Xi1(t), . . . , Xip(t)], wherein the tensor-data-two of the p channel Xi(t) is divided into L sample subspaces Sl, l=1, 2, . . . , L, L is a positive integer, in a same sample subspace, signal functions corresponding to each signal have cross-correlation, the signal functions corresponding to each signal in different sample subspaces have no correlation;

step 3: setting each sample subspace Sl as a linear superposition of Φl of dl basis functions, as shown in formula (2), wherein Φl=[Φl1(t), . . . , Φldl(t)]:

$$S_l \triangleq \left\{ X(t) \mid X(t) = \sum_{q=1}^{d_l} \alpha_q \phi_{lq}(t), \alpha_q \in R \right\} \quad (2)$$

wherein for all signal functions Xij(t), l=1, . . . ,N, sample subspace to which Xij(t) belongs remains unchanged, while basis coefficients αij corresponding to Xij(t) are different, and αijk is a k-th component of the basis coefficients αij, where k is a positive integer less than or equal to dl;

wherein Xl represent the signals of the respective sample subspaces, wherein Xl={Xj(t)|Xj(t)∈Sl, j=1, . . . , p}, q and dl are both positive integers, and αq is a set real number, R is a set of real numbers;

step 4: obtaining formula (3) for each signal Xij(t), Xij(t)∈Xl, according to self-expression property of data that each data point in the sample subspace can be jointly represented by other data points in a data set:

$$X_{ij}(t) = \sum_{X_{ir}(t)\in X_l} b_{jr} X_{ir}(t) \quad (3)$$

that is, Xij(t) is a signal function in Xl, which can be expressed as a linear combination of other pl-1 signals in this sample subspace, r is a positive integer, and bjr is a rth component of a sparse coefficient;

step 5: using an Lq norm to minimize an objective function to limit solution set for a solution of a sparse coefficient bj;
wherein the modeling system comprises a computer-one, the method runs on the computer-one, and further comprises the following steps:
the computer-one building an information link between the computer-one and a computer-two;
the computer-one sending a number of reduced information frames with the sparse coefficient to the computer-two, based on the conditions of the information link between the computer-one and the computer-two;
wherein the computer-one sends different reduced information frames of the sparse coefficients under the conditions of different information links;
after the computer-one sending a number of reduced information frames with the sparse coefficient to the computer-two, based on the conditions of the information link between the computer-one and the computer-two, the computer-one monitoring whether the information link between the computer-one and computer two is interrupted;
when so, the computer-one registers reduced information frames of the sparse coefficient which are not sent or sent unsuccessfully, and the reduced information frames of the sparse coefficient which are not sent or sent unsuccessfully are registered as not sent;
when the computer-one and the computer-two restore the information link, the computer-one sends a number of reduced information frames of the sparse coefficient that registered as not sent to the computer-two.

6. The method for the modeling system for the collected data of the sensors on the numerical control machine tool according to claim 5, wherein restriction conditions for using the Lq norm to minimize the objective function to limit the solution set for the solution of the sparse coefficient bj are as shown in the formula group (4):

$$\begin{cases} \min\|b_j\|_q \\ \text{subject to } X_{ij}(t) = X_i(t)b_j, \ b_{jj} = 0 \end{cases} \quad (4)$$

wherein q is a set integer value, which can take a value 1;
using convex programming tools such as a formula group (5) to effectively solve the sparse coefficient bj, s in the formula group (5) is a sampling time after the sampling time t:

$$\min\|b_j\|_1 + \frac{1}{2}\sum_{i=1}^{N}\int Z_{ij}(t)\Gamma_j(t,s)^{-1}Z_{ij}(s)dtds \quad (5)$$

subject to $Z_{ij}(t) = Y_{ij}(t) - Y_i(t)b_j, \ b_{jj} = 0$ in this way, the sparse coefficient bj is obtained and displayed on the display screen, j=1, ..., p.

7. The method for the modeling system for the collected data of the sensors on the numerical control machine tool according to claim 6, wherein the method further comprises the following steps:
the computer-one obtaining an information of the sparse coefficient to be saved in the computer-one;
the computer-one obtaining a transfer command for the information of the sparse coefficient to be saved;
the computer-one using run-length coding algorithm to reduce a capacity of the information of the sparse coefficient to be saved, and obtaining a number of information frames of reduced sparse coefficient.

\* \* \* \* \*